Feb. 4, 1947.  A. M. THOMSEN  2,415,152
METHOD OF MAKING CHLORINE
Filed April 27, 1942
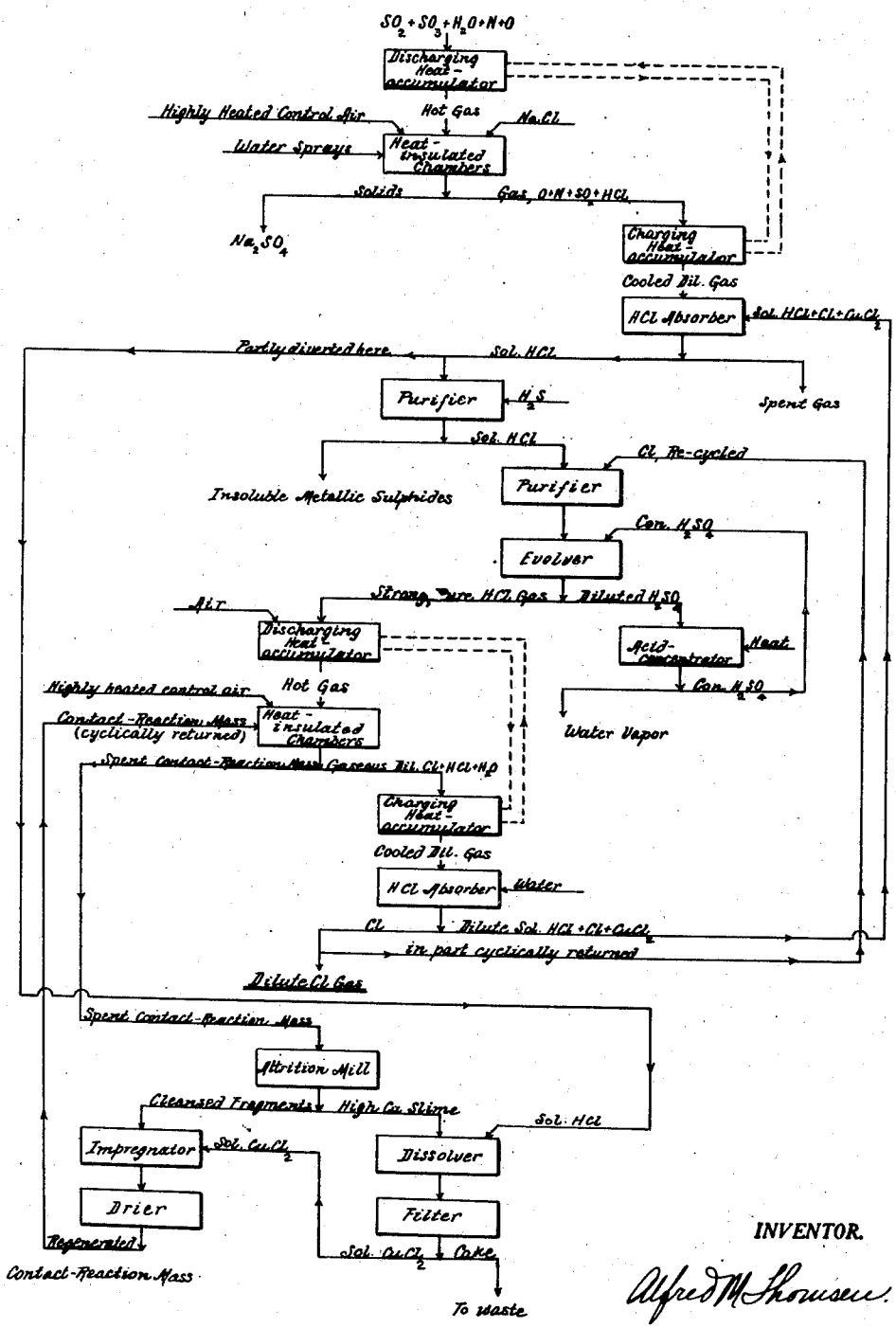
INVENTOR.
Alfred M Thomsen Patented Feb. 4, 1947

2,415,152

UNITED STATES PATENT OFFICE 2,415,152

METHOD OF MAKING CHLORINE

Alfred M. Thomsen, San Francisco, Calif.

Application April 27, 1942, Serial No. 440,597

2 Claims. (Cl. 23—219)

With very few exceptions the state of the art of chlorine making of today is represented by the electrolysis of some metallic chloride. Prior to the development of this technique sundry purely chemical methods were in vogue among which might be mentioned the original manganese ore method, Weldon's process with its manganese recovery, and the purely thermic method of Deacon. As all these processes started not with salt, or other metallic chloride, but with hydrochloric acid, the preparation of this acid by either the saltcake or other method was an inevitable prelude to the actual manufacture of chlorine.

In the method herein described I follow in general the chemical outline of these historic old processes, I do not consider that I have added anything to the chemistry, proper, of these well known operations but I do believe that I have so altered and improved upon the mechanics of said operations that they become capable of competing with the present day electrolytic methods. If this be so then a notable contribution to the art of chlorine making has been developed.

My process naturally divides into three portions, namely the production of the hydrochloric acid, the concentration and purification of said acid, and finally the liberation of the chlorine resident in said acid by the oxidation of the combined hydrogen.

This statement does not imply that I have linked three well known operations together and call them one process but, contrariwise, that these steps link together, with the improvements which I have added, to make a composite whole. The truth of this statement will become self-evident when the flowsheet, attached hereto, has been fully explained.

For the production of my hydrochloric acid I elect to use the Hargreave reaction, i. e., passing a mixture of air and $SO_2$ in the presence of steam through a body of salt to obtain sodium sulphate and a dilute form of hydrochloric acid gas. The operation proceeds best at a low red heat. This, of course, is very old.

To liberate the chlorine in this hydrochloric acid I oxidize the hydrogen by more atmospheric air in the presence of a catalyst using the equally well known Deacon reaction. I select these particular reactions upon which to build my process because they represent the cheapest and simplest means by which chlorine can be separated from salt, the most abundant and the cheapest chloride in existence. Of course, the corresponding potash salt can be substituted whenever potassium sulphate, per se, is also an objective in the manufacture of chlorine.

On the flow sheet I show the first and third step linked by a double dotted line with arrows indicating reversal of flow at separate periods of the operation. I designate these devices by the name "heat-accumulators" and one is called "charging" while the other is called "discharging."

By this I mean that the heat in the hot gases leaving the device labelled "Heat-insulated chambers" is abstracted by the heat-accumulator designated "charging" and the gases correspondingly reduced in temperature. By reversal of flow this charged heat-accumulator is now made the initial unit in the circuit and its heat is communicated to the entering mixture of air and $SO_2$.

While it is true that the gases leaving the heat-insulated chambers, filled with the reacting salt, are at operating temperatures due to the exo-thermic character of the Hargreave reaction nevertheless this heat exchange is not sufficient to heat the incoming gases with any degree of safety. I therefore show an additional source of heat entering the chambers, to wit, "highly heated control air." By this I mean additive air heated to a much higher temperature than required by the Hargreave reaction, so that a relatively small amount of such air commingled with the reacting gases will serve as the means of controlling the temperature of the composite gas stream within very narrow limits. Such air may be added before the first of the series of chambers or equally well between any pair of chambers and thus the possible danger of a drop in temperature, through carelessness or otherwise, becomes subject to instant control and correction.

Entering into the reaction in the same chambers I also show salt and water sprays. By this I mean that the chambers are filled with the customary pre-heated, porous, salt lumps that became standard practice in the last century, and that an undue rise in temperature can be checked by the use of a water spray between any pair of chambers, when and if such temperature should approach the fusion point of the mixture of salt cake and salt with which the chambers ultimately become filled. As steam is an essential to the reaction the absorption of heat as latent heat of evaporation of water is a very convenient means of control when cooling is required. Cold air could, of course, be substituted with consequent dilution of the reacting gases.

In the entering gases I also show $SO_3$ as a component. That is because I have found that a substantial increase in this constituent greatly accelerates the reaction and this is no objection when such perfect control is excercised as that rendered possible by the herein described procedure.

The hydrochloric acid produced in this operation is far too impure and too dilute to be used at once in the Deacon reaction for which it is destined. It must first be purified and concentrated. To effect this it is absorbed in an aqueous menstruum but not in water. This absorbing medium is the product of the purification of the chlorine gas itself after it has been formed in said Deacon's reaction. It is an aqueous solution of HCl, but quite dilute and containing as well some dissolved chlorine gas, $CuCl_2$, etc. By itself it would be entirely worthless.

But when it is used as an absorber in the Hargreave division of the chlorine process it fits into a proper place for the the contained chlorine expends itself upon the $SO_2$ content of the Hargreaves step which is never quite complete and completely oxidizes any other components. Simultaneously it is enriched in HCl to a concentration of 20% which is about the limit of concentration possible with warm, dilute HCl gas.

This product now enters the purifier where it is treated with $H_2S$ for the removal of copper salts, arsenic, antimony, etc., that may have been introduced as components of the original gas, which in practice will generally be produced from the roasting of a metallic ore and not by the burning of brimstone. Such roaster fumes are generally very impure.

After the removal of the metallic sulphides that were precipitated by the use of hydrogen sulphide, the acid is again treated with enough chlorine gas to ensure the complete oxidation of sulphur compounds to the state of sulphuric acid, the one sulphur compound which is inoccuous at this step. This fact is because the next step consists in commingling the dilute aqueous HCl with a cyclic flow of concentrated sulphuric acid which is continuously being concentrated by heat and returned to a fresh quantity of HCl. The water contained in the HCl is thus eliminated as water vapor in the concentration of the sulphuric acid and very pure HCl escapes in gaseous form from the "evolver."

The next phase of the operation consists in the liberation of the chlorine from the hydrochloric acid by oxidizing the hydrogen as previously stated. This is done by commingling it with an excess of air, heating it to a temperature between 430 and 500 degrees centigrade and passing it over a suitable catalyst which in this case consists of a mass of broken fire brick impregnated with cupric chlorice and dried. This is the well known Deacon reaction.

The chlorine formed still contains considerable hydrochloric acid and a great deal of nitrogen and excess air. There is also considerable volatilized copper chloride, particularly if the temperature has been allowed to go too high. Such items must be removed. The gas is therefore cooled and thoroughly scrubbed with water to remove both hydrogen and copper chlorides, dried and the chlorine separated from the excess of inert gases by compression, refrigeration or a combination of both, unless usable in its dilute form.

Heating and cooling of the gas is performed in the identical manner already described under the manufacture of the hydrochloric acid and is indicated on the flow sheet in the identical manner formerly used namely, a double dotted line with reversed arrows to indicate reversal of flow. The scrubbing fluid with its chlorine and copper content is used as the absorbing medium in the initial step of recovering the dilute hydrochloric acid gas as already stated.

The final item on the flow sheet deals with the regeneration of the contact or reaction mass, something that was never successful in the old Deacon operation. I find that the copper salt penetrates but superficially into the fire brick but the subsequent use "glazes" the brick and renders the catalyst inactive largely through a "covering" action. It was doubtless for this reason that the old process of "re-dipping and drying" was everywhere abandoned. It was simply an item of expense and failed to work. The reason appears to be that the physical texture of the brick surface has so altered as to be useless.

In consequence it became universal practice to discard the catalytic mass as soon as it became inactive, and as the copper content was too small to salvage, rarely above ¾% Cu, that meant throwing it away. The cost for both brick and copper salt thus became a notable part of the expense.

I overcome the difficulty in the following manner. I put the spent contact mass within a revolving cylinder, either wet or dry, and revolve the cylinder until a thin "skin" has been worn away from the surface of the brick. If the milling be performed wet there will result a slime high in copper and the remaining brick fragments will be as good for impregnation as they were at the start. In this manner both brick and copper are salvaged for the brick is simply reused and the copper slime is high enough in copper to make recovery of the copper profitable.

As the copper content is all soluble in hydrochloric acid, in fact a part is water soluble, it follows that it can be used directly together with a part of the hydrochloric acid from the initial step to make fresh cupric chloride for the impregnation of the cleansed brick fragments. This step is fully shown on the flowsheet, where the revolving cylinder appears under the name "attrition mill."

The contributions that I have made to the manufacture of chlorine from common salt by purely thermic methods may thus be summarized as follows: I have linked together the Hargreave and the Deacon reactions by a concentration-purification step on the dilute, impure gaseous hydrochloric acid produced in the former reaction so that it becomes material of the very highest quality for the Deacon reaction. Furthermore, I have made this concentration-purification step the means of utilizing a very annoying secondary product resulting from purifying the chlorine produced in the Deacon reaction so that the over-all recovery of chlorine from the salt will approach to theory. In so doing I have also made the circuit "closed" as to copper losses.

I have then introduced into the technique of these two old processes the modern technique of heat-interchange, and the added step of more perfect control of the operation by the admixture of highly heated control air to the stream of reacting gases. Conversely I have also shown the value of absorbing excess heat due to the exothermic nature of both reactions by converting said sensible heat into latent heat of evaporation of water, whenever the steam thus produced is inocuous.

The introduction of these modern features convert this old technique into something of real value and also permit of minor improvements of which one has already been mentioned, namely, the conversion of a part of the $SO_2$ in the Hargreave reaction into $SO_3$ and thus decreasing materially the time the salt must remain static in the chambers to insure its entire conversion into sulphate. A much greater advantage resides in the simplification of apparatus, as the miles of cast iron cooling pipes, and heating pipes, as well as the cast iron containing vessels used in both processes become replaced by the simple brick construction of heat accumulators and of heat-insulated simple brick chambers. It is self-evident that far better control can be obtained by heating and/or cooling the gas itself as herein prescribed than by the clumsy technique of the past century.

To illustrate: It took a week or more to heat an old-fashioned Hargreave "cylinder" to reaction temperature so that it could be placed "in the line." Then, when the reaction was finished, it took at least three more days to cool such a cylinder to a temperature where excavation of same could be commenced. Contrariwise, my operation would appear as follows:

A recently filled chamber, containing somewhat pre-heated salt, is awaiting its turn to replace a chamber that is just finishing. Cold air is now passed through this finished salt cake in a slow stream so that it will issue very hot from the exit opening which in turn is connected with the entrance of the new chamber. In this manner the heat abstracted from the cooling salt cake will largely be transferred to the new salt which then will be brought up to the proper temperature by a more liberal temporary use of the "very hot control air" as previously mentioned. Thus an operation which in the past took many days now becomes complete in a matter of hours.

My process may thus be said to consist of some old chemistry upon which has been superimposed heat recuperation and control together with purity of reacting mediums and re-vivification of the catalyst.

Having thus fully described said process, I claim:

1. In a heat recuperative process for making chlorine from gaseous hydrochloric acid in which the combined hydrogen thereof is oxidized by means of atmospheric air in the presence of a catalyst consisting of fragments of brick superficially impregnated with cupric chloride, at temperatures above 400° C., and which further comprises passing the spent gases from said reaction into a heat exchanger to indirectly transfer the heat to the incoming mixture of air and hydrochloric acid gas thus heating the incoming mixture to approximately proper reaction temperature, the spent gases becoming cooled by said heat interchange; the improvement which comprises periodically regenerating said catalyst by mechanically removing the superficial layer of cupric chloride impregnated brick, reimpregnating the cleansed fragments with fresh cupric chloride, and reusing the reactivated catalyst in the process.

2. In a heat recuperative process for making chlorine from common salt which comprises converting the chlorine in said salt into gaseous hydrochloric acid by interaction with $SO_3$, steam and air at approximately a red heat, indirectly transferring the heat in the gaseous reaction products to the incoming gases which thus become heated to approximately reaction temperature; absorbing the hydrogen chloride in the cooled reaction products in a special aqueous fluid produced at a later step in the process thus yielding an impure aqueous hydrochloric acid of about 20% strength; purifying said acid by means of hydrogen sulphide and separating the precipitate thus formed, and then adding chlorine to oxidize any $H_2S$ and $SO_2$ still present therein; commingling the acid thus purified with concentrated $H_2SO_4$ to absorb the $H_2O$ and liberate concentrated HCl gas, heating the $H_2SO_4$ to reconcentrate it and eliminate $H_2O$ vapor, and recycling the reconcentrated $H_2SO_4$; commingling the gaseous hydrochloric acid thus obtained with air and passing it over a catalyst consisting of fragments of brick superficially impregnated with cupric chloride to promote the oxidation of the hydrogen resident therein at temperatures above 400° C., thus liberating the contained chlorine, the heat of gases from said reaction being indirectly transferred to said cool mixture of air and hydrochloric acid gas before said mixture is admitted to the catalyst, the gases from the reaction becoming cooled by said heat interchange; scrubbing said cooled gases with sufficient water to absorb the residual HCl gas to form a dilute solution of hydrochloric acid, said dilute acid being the "special aqueous fluid" formerly specified as required for such absorption; the improvement which comprises regenerating the catalyst employed by mechanically removing the superficial layer of cupric chloride impregnated brick, reimpregnating the cleansed fragments with fresh cupric chloride, said cupric chloride being produced by commingling the removed superficial layer with a portion of the hydrochloric acid of 20% strength above mentioned and separating the impurities resident in said mixture; reusing the reactivated catalyst in the process.

ALFRED M. THOMSEN.

REFERENCES CITED

The following references are of record in the file of this patent:

UNITED STATES PATENTS

| Number | Name | Date |
| --- | --- | --- |
| 165,801 | Deacon | July 20, 1875 |
| 1,917,226 | Bacon | July 11, 1933 |
| 2,204,172 | Balcar | June 11, 1940 |
| 1,412,219 | Richardson | Apr. 11, 1922 |
| 2,160,700 | Knox | May 30, 1939 |
| 2,087,893 | Bacon | July 27, 1937 |
| 2,068,430 | Oliver | Jan. 19, 1937 |
| 1,947,779 | Huff, et al. | Feb. 20, 1934 |
| 2,232,121 | Linder | Feb. 18, 1941 |
| 2,312,952 | Balcar | Mar. 2, 1943 |
| 1,500,289 | Weber | July 8, 1924 |
| 1,857,414 | Thomsen | May 10, 1932 |

FOREIGN PATENTS

| Number | Country | Date |
| --- | --- | --- |
| 1,403 | Great Britain | of 1868 |
| 3,253 | Great Britain | of 1873 |
| 26,537 | Great Britain | 1901 |
| 21,412 | Great Britain | 1893 |
| 1,908 | Great Britain | of 1871 |
| 508 | Great Britain | of 1872 |
| 433 | Great Britain | of 1882 |

OTHER REFERENCES

Lunge, Sulfuric Acid and Alkali, vol. II, part I, 1909, pages 218-261; vol. III, 1911, pages 438-489.